July 30, 1940.　　　　B. SELHORST　　　　2,209,478
COMBINATION FARM IMPLEMENT
Filed Sept. 30, 1939　　　2 Sheets-Sheet 1
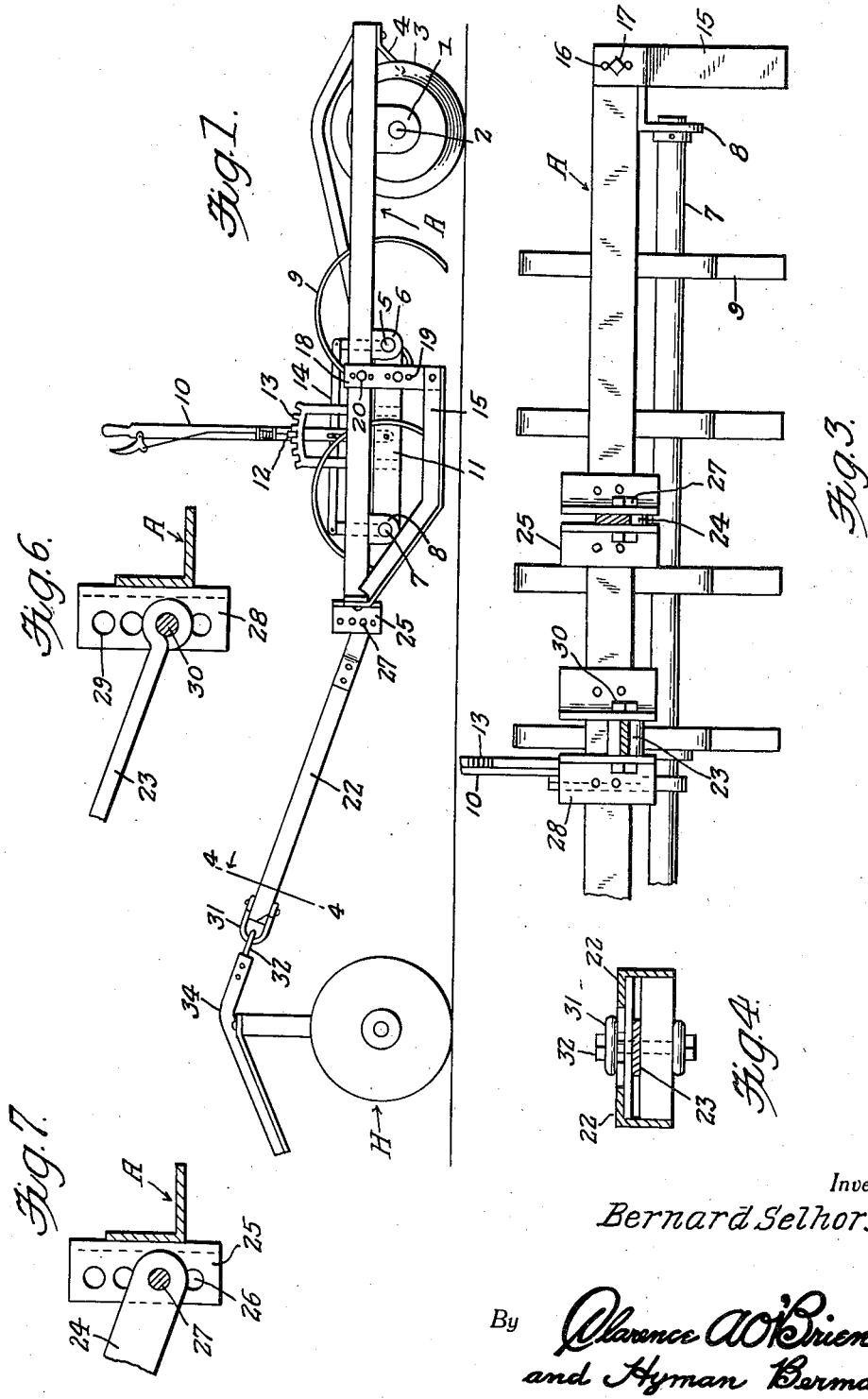
Inventor
Bernard Selhorst,
By Clarence A. O'Brien
and Hyman Berman
Attorneys July 30, 1940.  B. SELHORST  2,209,478
COMBINATION FARM IMPLEMENT
Filed Sept. 30, 1939  2 Sheets-Sheet 2
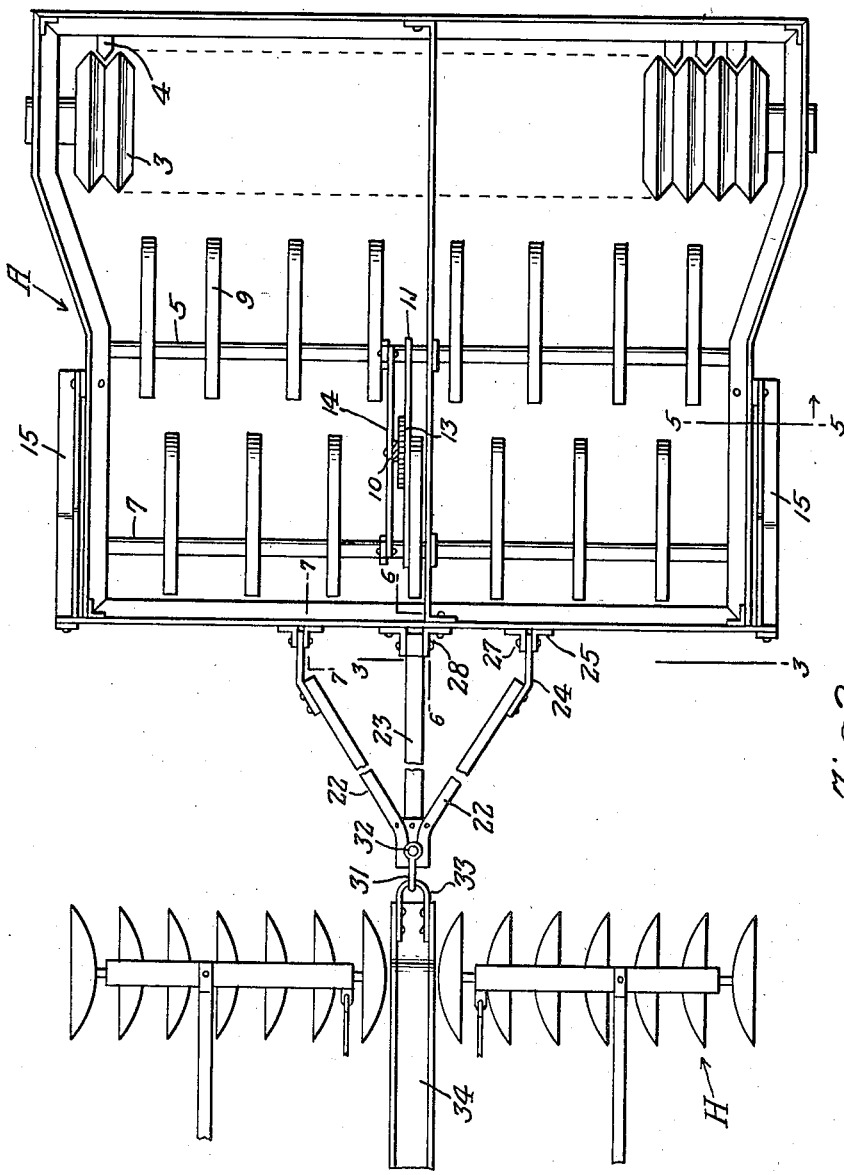
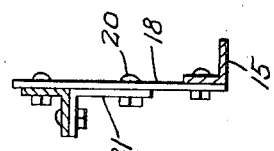
Inventor
*Bernard Selhorst*,
By *Clarence A. O'Brien
and Hyman Berman*
Attorneys Patented July 30, 1940

2,209,478

UNITED STATES PATENT OFFICE 2,209,478

COMBINATION FARM IMPLEMENT

Bernard Selhorst, Coldwater, Ohio

Application September 30, 1939, Serial No. 297,375

3 Claims. (Cl. 55—12)

This invention relates to a combination farm implement for the cultivation and preparation of seed beds for various crops, the general object of the invention being to provide a frame carrying spring toothed harrows in its front portion and a packer at its rear with improved means for connecting the frame to a disk harrow so that the two harrow assemblies and the packer thoroughly cultivate the soil and prevent "ridging" of the soil.

Another object of the invention is to provide the frame with runners with means for adjustably connecting the runners with the frame and means for adjustably connecting the draft means with the front of the frame so that the device will properly operate regardless of the soil condition, as long as the soil is in condition to be cultivated.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevational view of the implement attached to a disk harrow.

Figure 2 is a top plan view of Figure 1.

Figure 3 is a section on the line 3—3 of Figure 2.

Figure 4 is a section on the line 4—4 of Figure 1.

Figure 5 is a section on the line 5—5 of Figure 2.

Figure 6 is a section on the line 6—6 of Figure 2.

Figure 7 is a section on the line 7—7 of Figure 2.

In these views the letter A indicates a frame of substantially rectangular shape in plan but having its rear part wider than its front part as clearly shown in Figure 2. This wide rear part has the depending bearing members 1 on its side part for the shaft 2 of a corrugated roller 3 which is known as a "cultipacker". Spring teeth 4 extend forwardly and downwardly from the rear member of the frame A into the grooves formed by the corrugations to clear said grooves of dirt. In the rear portion of the narrow part of the frame is journaled a transverse shaft 5 in the bearing members 6 depending from the side members of this part of the frame and a similar shaft 7 is journaled in the front part of the frame in the bearing members 8. Both of these shafts 5 and 7 carry the spring harrow teeth 9 of the usual or any desired construction. The two shafts 5 and 7 are adapted to be rocked in unison to raise and lower the teeth 9 by a hand lever 10 pivotally connected at its lower end on a part 11 of the frame adjacent the center thereof and said lever is provided with the usual detent means 12 for cooperating with a toothed quadrant 13 for holding the lever in adjusted position. The lever is connected to the shafts 5 and 7 by a linkage arrangement 14 which rocks the two shafts in unison when the lever 10 is moved. As will be seen the packer 3 is of greater length than the length of the two series of teeth and this causes the packer to remove all ridges left by the spring teeth 9, particularly by the outside teeth. This is desirable as a planter using a ground marker, the ridge is often mistaken for the planter mark with the result that the planter is misguided.

Runners 15 are provided for the frame for keeping the teeth operating evenly with the contour of the ground. Each runner is formed with a horizontal rear part and an upwardly and forwardly sloping front part and each runner is preferably of angle shape with one flange arranged horizontally as shown more particularly in Figure 1. The front end of each runner is vertically arranged and is provided with a vertical row of holes 16 any one of which receives a bolt 17 which connects the front end of the runner to the front part of the frame. A vertically arranged bar 18 is bolted to the rear end of each runner and this bar has a vertically arranged row of holes 19 therein for receiving the bolts 20 for engaging a side member of the main frame and a depending part 21 on the side member as shown in Figure 5. Thus by changing the bolts 17 and 20 to different holes each runner can be adjusted vertically and thus further regulate the degree of penetration of the spring teeth in the soil. A draft member is connected with the front of the frame for connecting the same to a disk harrow H and said draft member is composed of the forwardly converging bars 22 and the central rod 23. A strap 24 is attached to the rear end of each bar 22 and has its rear end extending into the space between a pair of brackets 25 attached to the front of the frame and each bracket has a vertical row of holes 26 therein any one of which receives the bolt 27 which connects the strap with the bracket. A similar pair of brackets 28 is connected to the central portion of the front member of the frame and any one of the holes 29 in said brackets 28 is adapted to receive the bolt 30 which connects the member 23 to the brackets. Thus these bolts 27 and 30 can be adjusted in the brackets to raise and lower the points of connection of the parts of the draft member at the front of the frame and a clevis 31 is pivoted to the front end of the draft member by a vertically arranged pivot 32 and a similar clevis 33 is connected to the bar 34 where said bar slopes downwardly and rearwardly from the frame of the harrow H. As will be seen the draft member slopes upwardly and forwardly to the point where the clevis is connected with the downwardly and rearwardly sloping bar 34 of the harrow. This form of hitch between the combination implement and the harrow H permits close coupling of the parts and the frame will easily follow the harrow H when the implements are making a turn. The hitch permits full oscillation in every direction so that while in operation the harrow H and the combination implement are individually flexible. The line of draft between the disk harrow and the combination unit is upwardly because the disk or drive member couples to the combination unit and at lower level than its connection to the disk harrow. The pressure developed is an upward pressure and the series of holes for receiving the bolts for connecting the draft member to the frame allows the parts to be adjusted as to this upward pressure so as to fit soil condition of all kinds while the weight of the unit keeps it down in hard soil. The adjustment of the runners permits the spring teeth to run evenly over the soil at whatever depth the operator desires.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An implement for the cultivation and preparation of seed beds comprising a disk harrow having a downwardly and rearwardly extending part thereon, a frame, shafts in the front part of the frame, spring harrow teeth carried by the shafts, a packer roller rotatably carried by the rear part of the frame, and draft means for connecting the front of the frame with said downwardly and rearwardly part of the disk harrow, said draft means including clevises, one connected with the downwardly and rearwardly extending part and the other with the draft means of the frame, said draft means of the frame extending upwardly and forwardly and means for pivotally connecting said draft means of the frame to the front part of the frame.

2. An implement for the cultivation and preparation of seed beds comprising a disk harrow, a frame, shafts in the front part of the frame, spring harrow teeth carried by the shafts, a packer roller rotatably carried by the rear part of the frame, and draft member for connecting the front of the frame with the rear part of the disk harrow, said draft member extending upwardly and forwardly and the disk harrow having a part extending downwardly and rearwardly, clevises connecting the front end of the draft member with the rear end of said downwardly extending part and means for adjustably connecting the draft member to the front of the frame for adjusting such connection vertically.

3. An implement for the cultivation and preparation of seed beds comprising a disk harrow, a frame, shafts in the front part of the frame, spring harrow teeth carried by the shafts, a packer roller rotatably carried by the rear part of the frame, said roller being of greater length than the lengths of the series of spring teeth and draft member for connecting the front of the frame with the rear part of the disk harrow, said draft member extending upwardly and forwardly and the disk harrow having a part extending downwardly and rearwardly, clevises connecting the front end of the draft member with the rear end of said downwardly extending part and means for adjustably connecting the draft member to the front of the frame for adjusting such connection vertically, runners for the front of the frame and means for adjusting the runners vertically.

BERNARD SELHORST.